(12) United States Patent
Nagato (10) Patent No.: US 12,481,239 B2
(45) Date of Patent: Nov. 25, 2025

(54) IMAGE PROCESSING SYSTEM WITH IMAGE SURFACE LAMINATION

(71) Applicant: Konica Minolta, Inc., Tokyo (JP)

(72) Inventor: Hiromu Nagato, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 37 days.

(21) Appl. No.: 18/408,769

(22) Filed: Jan. 10, 2024

(65) Prior Publication Data

US 2024/0248429 A1    Jul. 25, 2024

(30) Foreign Application Priority Data

Jan. 20, 2023   (JP) ................................ 2023-006924

(51) Int. Cl.
G03G 15/00  (2006.01)
G03G 15/20  (2006.01)
H04N 1/00   (2006.01)

(52) U.S. Cl.
CPC ..... *G03G 15/5062* (2013.01); *G03G 15/2028* (2013.01); *G03G 15/2064* (2013.01); *G03G 15/6576* (2013.01); *H04N 1/00013* (2013.01); *H04N 1/00037* (2013.01); *H04N 1/00082* (2013.01); *H04N 1/00092* (2013.01); *H04N 1/00798* (2013.01); *G03G 2215/00548* (2013.01)

(58) Field of Classification Search
CPC .......... G03G 15/2028; G03G 15/2064; G03G 15/5062; G03G 15/6576; G03G 15/6582; G03G 21/00; G03G 2215/00548; H04N 1/00; H04N 1/00013; H04N 1/00037; H04N 1/00082; H04N 1/00092; H04N 1/00798

See application file for complete search history.

(56) References Cited

U.S. PATENT DOCUMENTS

| 10,659,622 | B2* | 5/2020 | Isokawa | H04N 1/00058 |
| 2020/0117135 | A1* | 4/2020 | Asakawa | G03G 15/5062 |
| 2022/0179349 | A1* | 6/2022 | Nomura | G03G 15/5025 |
| 2023/0106997 | A1* | 4/2023 | Esumi | G03G 15/5062 |
| | | | | 358/498 |
| 2024/0083158 | A1* | 3/2024 | Kitaguchi | B32B 38/0004 |

FOREIGN PATENT DOCUMENTS

JP    2022153987 A    10/2022

* cited by examiner

*Primary Examiner* — Sophia S Chen
(74) *Attorney, Agent, or Firm* — CANTOR COLBURN LLP

(57) ABSTRACT

An image processing system includes a reader that reads an image surface of a flat cut sheet on which an image is formed; and a laminator that is arranged on the downstream side of the reader in a conveyance direction of the flat cut sheet and laminates an image surface of the flat cut sheet.

13 Claims, 6 Drawing Sheets

IMAGE PROCESSING SYSTEM WITH IMAGE SURFACE LAMINATION

CROSS-REFERENCE TO RELATED APPLICATIONS

The present invention claims priority under 35 U.S.C. § 119 to Japanese Patent Application No. 2023-006924, filed on Jan. 20, 2023, the entire content of which is incorporated herein by reference.

BACKGROUND OF THE INVENTION

Technical Field

The present invention relates to an image processing system.

Description of Related Art

In the related art, a laminating device that performs lamination in which a sheet (printed material) on which an image is formed is coated with a transparent resin film has been known.

There has been disclosed a technique for adjusting an image position when the lamination is performed by the laminating device (see, for example, Japanese Unexamined Patent Publication No. 2022-153987). Specifically, first, in addition to an image (job image) of a portion to be laminated on the continuous sheet, a mark image indicating a range to be laminated is printed. Next, this mark image is read by the reading section, and thus it is determined whether or not the assumed position is laminated in the next job. Then, in a case where it is determined that the assumed position is not laminated, the image position is adjusted.

It is known that a sheet after printing is curled due to printing conditions and environment. In a case where the lamination is performed on the curled sheet, there is a concern that the quality of the output material may be degraded. The deterioration in the quality of the output material is, for example, occurrence of a jam (sheet jam) or folding in a lamination section or curling of the laminated output material. Generally, a laminate film is expensive. Therefore, in the lamination, it is necessary to pay more attention to curling than in normal printing. At present, in order to cope with the above-described problem, a dedicated person takes time to manually perform adjustment so that the curl falls within an appropriate curl region.

In addition, in a case where an adjustment mistake occurs in the lamination or the lamination is performed on a contaminated sheet, waste of the film for recovery or re-lamination occurs. As a factor of a lamination error, for example, misalignment between the film and the sheet position, lamination on a sheet having an image defect, or the like is considered. At present, in order to prevent this problem, a person in charge performs manual adjustment or visual inspection.

Although the image position can be adjusted by the technique described in Japanese Unexamined Patent Publication No. 2022-153987, since the mark image needs to be read by a reading section, cooperation with an image forming section is required. In addition, since the mark image is printed, there are problems that a load applied to printing processing increases and that quality of an output product is deteriorated.

SUMMARY OF THE INVENTION

An object of the present invention is to provide an image processing system capable of improving the quality of a printed matter and suppressing the waste of an expensive laminate film.

The present invention has been made in order to achieve the above object, and provides an image processing system including, a reader that reads an image surface of a flat cut sheet on which an image is formed; and a laminator that is arranged on the downstream side of the reader in a conveyance direction of the flat cut sheet and laminates an image surface of the flat cut sheet.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

Hereinafter, embodiments of the present invention will be described in detail with reference to the drawings.

Figure 1:
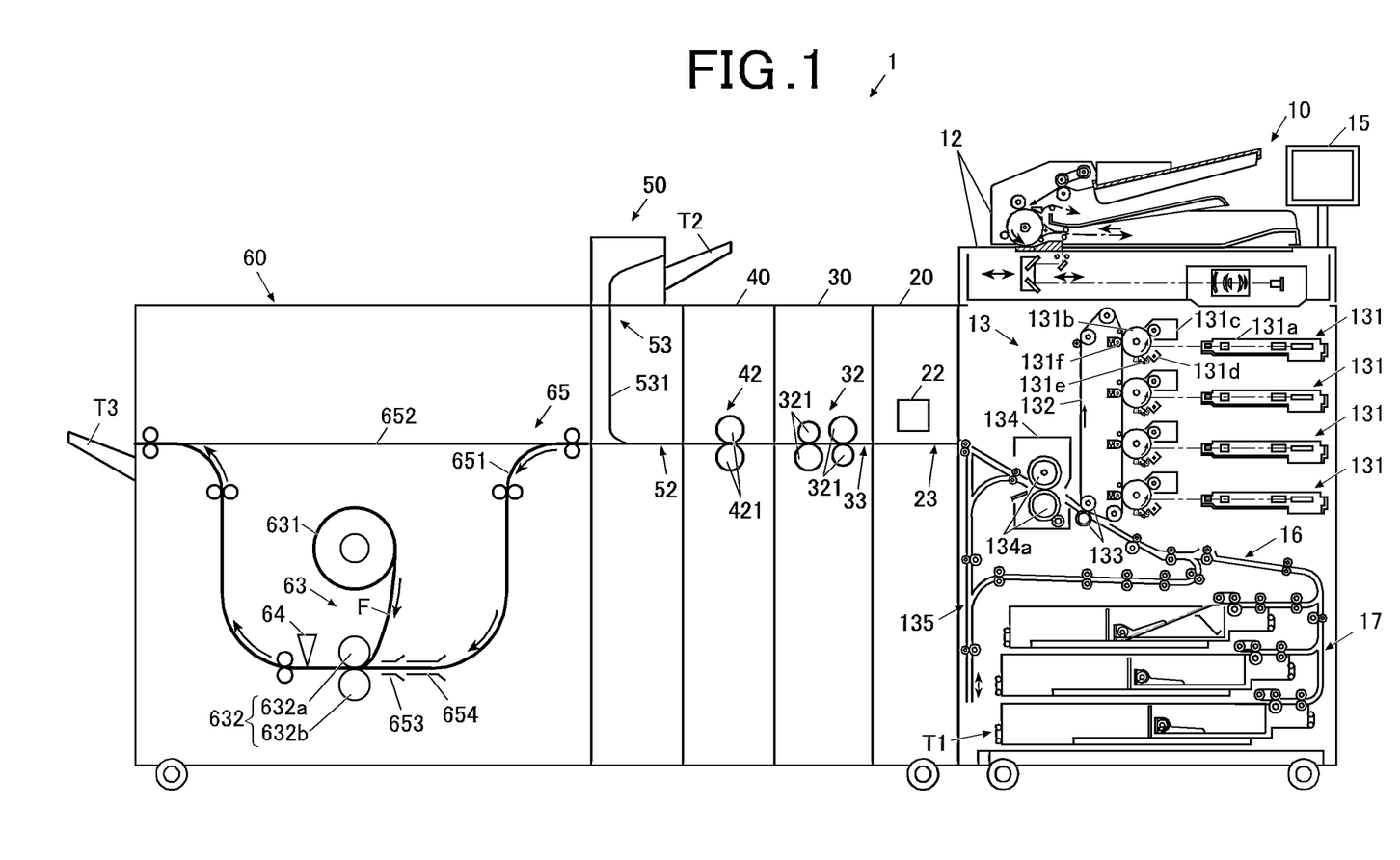
FIG. 1 is a diagram showing a schematic configuration of an image processing system according to the present embodiment.

As illustrated in FIG. 1, the image processing system 1 according to the present embodiment includes an image forming apparatus 10, an image reading device 20, a sheet correcting apparatus 30, a sheet position changing apparatus 40, a purge sheet ejection apparatus (purge sheet ejector) 50, and a laminating device 60.

The image forming apparatus 10 forms an image on a sheet which is a flat cut sheet based on print data.

Figure 2:
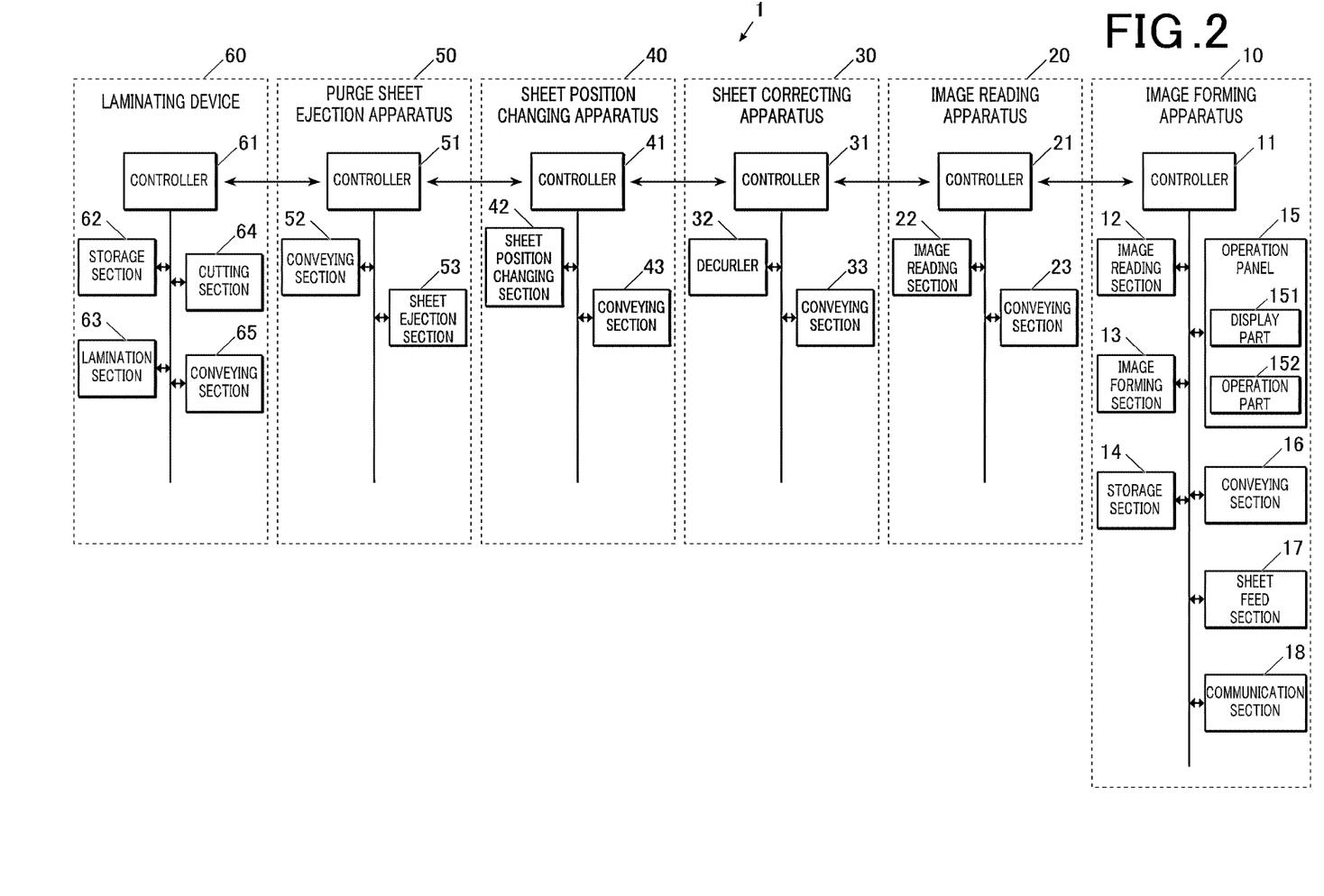
FIG. 2 is a block diagram showing a functional configuration of the image processing system according to the present embodiment.

As shown in FIG. 1 and FIG. 2, the image forming apparatus 10 includes a controller 11, an image reading section 12, an image forming section 13, a storage section 14, an operation panel 15, a conveying section 16, a sheet feed section 17, and a communication section 18.

The controller 11 includes a CPU, a RAM, a ROM, and the like. First, in response to various signals, the CPU reads various processing programs stored in the ROM and develops the programs in the RAM. The various signals are an operation signal input from the operation part 152, and an instruction signal received by the communication section 18.

Next, the CPU integrally controls the operation of the image forming apparatus 10 in cooperation with the various programs developed in the RAM.

First, the image reading section 12 scans and exposes an image of a document placed on a document plate or an automatic document feeder (ADF) with an optical system of a scanning exposure device. Next, the image reading section 12 reads the reflected light by the line image sensor to obtain an image signal. The image signal is subjected to processing such as analog-to-digital (A/D) conversion, shading correction, and compression, and is then input to the controller 11 as image data.

The image forming section 13 forms an image on a sheet by electrophotographic method, based on print data. The print data is image data read by the image reading section 12 or image data received from an external device. That is, the image forming section 13 forms a toner image on the sheet. The image forming section 13 forms an image composed of four colors of C, M, Y, and K on a sheet according to the pixel values of four colors of each pixel of the image data.

As shown in FIG. 1, the image forming section 13 includes four writing units 131, an intermediate transfer belt 132, a secondary transfer roller 133, and a fixing section 134.

Four writing units 131 are arranged in series (tandem) along a belt surface of the intermediate transfer belt 132, and form images of the respective colors of C, M, Y, and K. Each of the writing units 131 includes an optical scanning section 131a, a photoreceptor 131b, a developing section 131c, a charging section 131d, a cleaning section 131e, and a primary transfer roller 131f. The writing units 131 have the same configuration except that they form images in different colors.

To form images, the charging section 131d of each writing unit 131 charges the photoreceptor 131b. Thereafter, the optical scanning section 131a scans the photoreceptor 131b with light flux emitted based on image data and forms an electrostatic latent image. Next, the developing section 131c develops by supplying toner. Thus, the image forming section 13 forms an image (a single-color toner image) on the photoreceptor 131b.

Next, the primary transfer rollers 131f perform primary transfer to sequentially transfer the images formed on the photoreceptors 131b to the intermediate transfer belt 132 so that the images overlap. Thus, an image of each color (color toner image) is formed on the intermediate transfer belt 132. The intermediate transfer belt 132 is an image bearing member that is wound around a plurality of rollers to rotate. After the primary transfer, the cleaning section 131e removes the toner remaining on the photoreceptor 131b.

In the image forming section 13, a sheet is fed from a sheet feeding tray T1 at a timing when the image on the rotating intermediate transfer belt 132 reaches the position of the secondary transfer roller 133. One of a pair of secondary transfer rollers 133 comes into pressing contact with the intermediate transfer belt 132, and the other roller forms one of a plurality of rollers around which the intermediate transfer belt 132 is wound. The secondary transfer roller 133 secondarily transfers the image from the intermediate transfer belt 132 onto the sheet by pressure contact and conveys the sheet to the fixing section 134. The fixing section 134 performs a fixing process on the conveyed sheet. The fixing process is a process of fixing the image on the sheet by heating and pressing the sheet with the fixing roller 134a. When an image is formed on both sides of the sheet, a reverse path 135 reverses the side of the conveyed sheet and then feeds the sheet again to the position of the secondary transfer roller 133.

The storage section 14 is a nonvolatile storage means constituted by a hard disk drive (HDD), a solid state drive (SSD), or the like. The storage section 14 stores various programs, various setting data, and the like in a readable and writable manner according to control from the controller 11.

The operation panel 15 includes a display part 151 that displays various kinds of information to a user, and an operation part 152 that receives an operation input from the user.

The display part 151 may be, for example, a color liquid crystal display. The display part 151 displays an operation screen or the like (various setting screens, various buttons, an operation state of each function, or the like) according to a display control signal input from the controller 11.

The operation part 152 includes a touch screen provided on the screen of the display part 151 and various hard keys arranged around the screen of the display part 151. When a button displayed on the screen is pressed by a finger, a touch pen, or the like, the operation part 152 first detects coordinates of the pressed position by a voltage value. Next, the operation part 152 outputs an operation signal associated with the detected position to the controller 11. Note that the touch screen is not limited to a pressure-sensitive type, and may be, for example, an electrostatic type or an optical type. When a hard key is pressed, the operation part 152 outputs an operation signal associated with the pressed key to the controller 11.

The conveying section 16 includes a plurality of roller pairs. The conveying section 16 conveys the sheet supplied from the sheet feed section 17 to the image forming section 13 and conveys the sheet on which an image is formed by the image forming section 13 to the image reading device 20.

The sheet feed section 17 includes a sheet feed tray T1 and supplies the sheet from the sheet feed tray T1 to the image forming section 13. Sheets of a predetermined sheet type and size are stored in each sheet feed tray T1 for each sheet feed tray T1.

The communication section 18 is an interface that connects the image forming apparatus 10 to a communication network. The communication section 18 has a communication integrated circuit (IC), a communication connector, and the like. Under the control of the controller 11, the communication section 18 transmits/receives various kinds of information to/from the external device connected to the communication network using a predetermined communications protocol. Furthermore, the communication section 18 can also input and output various kinds of information via a universal serial bus (USB).

The image reading device 20 is connected to a subsequent stage of the image forming apparatus 10 and reads an image surface of a sheet on which an image is formed by the image forming apparatus 10 (image forming section 13).

As illustrated in FIGS. 1 and 2, the image reading device 20 includes a controller 21 (hardware processor), an image reading section (reading section, image reader, reader) 22, and a conveying section 23. That is, the image forming section 13 is disposed on an upstream side of the image reading section 22 in a sheet conveyance direction.

The controller 21 includes a CPU, a RAM, a ROM, and the like. First, the CPU reads various processing programs stored in the ROM and develops the programs in the RAM.

Next, the CPU integrally controls the operation of the image reading device 20 in cooperation with the various programs developed in the RAM.

The image reading section 22 reads the image surface of the sheet on which the image is formed by the image forming apparatus 10 (image forming section 13).

The conveying section 23 includes a plurality of roller pairs. The conveying section 23 conveys the sheet conveyed from the image forming apparatus 10 to the image reading section 22, and discharges the sheet read by the image reading section 22 to the sheet correcting apparatus 30.

In the present embodiment, the controller 21 judges a misregistration of the image with respect to a reference position based on a read result (image position) by the image reading section 22.

That is, the controller 21 functions as a first judgment section (first judgment process) of the present invention. Here, the reference position of the image is a reading start position by the image reading section 22 and is a position serving as a reference when the laminate film F is attached in the lamination section 63. Furthermore, the controller 21 further detects an image defect (a stain, a wrinkle, a color fluctuation, or the like) of the image formed on the sheet as the first judgment section. Note that a method of detecting an image defect is not particularly limited. As a method of detecting an image defect, for example, there is a comparison between a correct image read in advance and an acquired image, a comparison between an acquired image and print data (correct image), or the like.

In addition, the controller 21 judges a curling amount and curling direction of the sheet based on the read result (curling information) by the image reading section 22. That is, the controller 21 functions as a second judgment section (second judgment process) of the present invention.

The sheet correcting apparatus 30 is connected to a subsequent stage of the image reading device 20 and corrects a curl of a sheet read by the image reading device 20.

The sheet correcting apparatus 30 is disposed between the image reading device 20 (image reading section 22) and the laminating device 60 (lamination section 63 (laminator)). As illustrated in FIG. 1 and FIG. 2, the sheet correcting apparatus 30 includes a controller 31, a plurality of decurlers (decurl sections) 32, and a conveying section 33.

The controller 31 includes a CPU, a RAM, a ROM, and the like. First, the CPU reads various processing programs stored in the ROM and develops the programs in the RAM. Next, the CPU integrally controls the operation of the sheet correcting apparatus 30 in cooperation with the various programs developed in the RAM.

The decurler 32 includes a pair of correction rollers 321. The decurler 32 corrects a curl of a sheet read by the image reading device 20 by adjusting a nip pressure of the pair of correction rollers 321.

The conveying section 33 includes a plurality of roller pairs. The conveying section 33 conveys the sheet conveyed from the image reading device 20 to the decurler 32 and discharges the sheet that has passed through the decurler 32 to the sheet position changing apparatus 40. The sheet that has passed through the decurler 32 is a sheet of which curling has been corrected by the decurler 32 or a sheet that has passed through the decurler 32 without curling being detected.

In the present embodiment, the controller 21 of the image reading device 20 controls a curling correction force applied to the sheet by the decurler 32 on the basis of the curling amount and the curling direction judged by the second judgment section. That is, the controller 21 functions as a correction controller of the present invention.

The sheet position changing apparatus 40 is connected to a subsequent stage of the sheet correcting apparatus 30 and changes the position of the sheet read by the image reading device 20.

The sheet position changing apparatus 40 is disposed between the image reading device 20 (the image reading section 22) and the laminating device 60 (the lamination section 63). As illustrated in FIGS. 1 and 2, the sheet position changing apparatus 40 includes a controller 41, a sheet position changing section (flat cut sheet position changing section, flat cut sheet position changer) 42, and a conveying section 43.

The controller 41 includes a CPU, a RAM, a ROM, and the like. First, the CPU reads various processing programs stored in the ROM and develops the programs in the RAM. Next, the CPU integrally controls the operation of the sheet position changing apparatus 40 in cooperation with the various programs developed in the RAM.

The sheet position changing section 42 includes a pair of swinging rollers 421. The sheet position changing section 42 moves the pair of swinging rollers 421 in a width direction of the sheet (a direction orthogonal to the conveyance direction) in accordance with a timing at which the sheet passes. Thus, the sheet position changing section 42 changes the width-direction position of the sheet being conveyed.

The conveying section 43 includes a plurality of roller pairs. The conveying section 43 conveys the sheet conveyed from the sheet correcting apparatus 30 to the sheet position changing section 42 and ejects the sheet that has passed through the sheet position changing section 42 to the purge sheet ejection apparatus 50. The sheet that has passed through the sheet position changing section 42 is a sheet whose sheet position has been changed by the sheet position changing section 42 or a sheet that has just passed through the sheet position changing section 42 without the misregistration being detected.

In the present embodiment, when the misregistration judged by the first judgment section exceeds a first threshold value, the controller 21 of the image reading device 20 causes a sheet position changing section 42 to change the width-direction position of the sheet. That is, the controller 21 functions as a flat cut sheet position controller of the present invention. Here, the first threshold value is a misregistration amount with which the lamination by the lamination section 63 cannot be performed accurately unless the misregistration is corrected by a change of the sheet position by the sheet position changing section 42.

The purge sheet ejection apparatus 50 is connected to a subsequent stage of the sheet position changing apparatus 40 and ejects (purges) the sheet to a purge tray T2.

The purge sheet ejection apparatus 50 is disposed between the image reading device 20 (image reading section 22) and the laminating device 60 (lamination section 63). As illustrated in FIGS. 1 and 2, the purge sheet ejection apparatus 50 includes a controller 51, a conveying section 52, and a purge sheet ejection section (purge sheet ejector) 53.

The controller 51 includes a CPU, a RAM, a ROM, and the like. First, the CPU reads various processing programs stored in the ROM and develops the programs in the RAM. Next, the CPU integrally controls the operation of the purge sheet ejection apparatus 50 in cooperation with the various programs developed in the RAM.

The conveying section 52 is formed with a plurality of roller pairs and ejects the sheet conveyed from the sheet position changing apparatus 40 to the laminating device 60.

The purge sheet ejection section 53 is configured to include a purge path 531 which is branched from the conveying section 52 and is connected to a purge tray (purge storage section, purge storage) T2. The purge sheet ejection section 53 ejects (purges) the sheet conveyed from the sheet position changing apparatus 40 to the purge tray T2.

In the present embodiment, when the misregistration judged by the first judgment section exceeds the second threshold value or when an image defect is detected by the first judgment section, the controller 21 of the image reading device 20 causes the purge sheet ejection section 53 to purge the sheet to the purge tray T2. That is, the controller 21 functions as a purge controller of the present invention. Here, the second threshold value is the misregistration amount to the extent that the misregistration cannot be completely corrected by changing the sheet position by the sheet position changing section 42. That is, the second threshold value (uncorrectable misregistration amount) has a larger value than the first threshold value (correctable misregistration amount).

Note that when the misregistration judged by the first judgment section does not exceed the second threshold value and no image defect is detected by the first judgment section, the sheet is ejected as it is to the laminating device 60 by the conveying section 52.

The laminating device 60 is connected to the subsequent stage of the purge sheet ejection apparatus 50 and laminates the image surface of a sheet on which the image has been formed by the image forming apparatus 10 (image forming section 13).

The laminating device 60 is disposed on a downstream side of the image reading device 20 (image reading section 22) in the sheet conveyance direction. As illustrated in FIGS. 1 and 2, the laminating device 60 includes a controller 61, a storage section 62, a lamination section 63, a cutting section 64, and a conveying section 65.

The controller 61 includes a CPU, a RAM, a ROM, and the like. First, the CPU reads various processing programs stored in the ROM and develops the programs in the RAM. Next, the CPU integrally controls the operation of the laminating device 60 in cooperation with the various programs developed in the RAM.

The storage section 62 is a non-volatile storage means including an HDD and an SSD. The storage section 62 stores various programs, various setting data, and the like in a readable and writable manner from the controller 61.

The lamination section 63 performs a laminating process by overlapping a film having an adhesive layer on a surface (image surface) of the conveyed sheet on which an image is formed by the image forming apparatus 10. The film having an adhesive layer is a laminate film F. That is, the lamination section 63 laminates the image surface of the sheet having an image formed thereon.

The lamination section 63 includes a film roll 631 and a laminate fixing section 632.

The film roll 631 is a roll of a laminate film F including a transparent resin film layer and an adhesive layer. The laminate film F has an adhesive layer formed by applying a hot-melt adhesive to one side thereof (the side in contact with the sheet).

The laminate film F is conveyed from the film roll 631 to a nip portion of the laminate fixing section 632 and is adhered to the image surface of the sheet.

The laminate fixing section 632 includes a pair of rollers. In the laminate fixing section 632, the sheet and the laminate film F are nipped at a nip portion formed by a pair of rollers, and at least one of heat or pressure is applied thereto. Thus, the laminate fixing section 632 causes the adhesive layer of the laminate film F to adhere to the surface of the sheet, thereby bonding the sheet and the laminate film F together.

In the present embodiment, the laminate fixing section 632 includes a heating roller 632*a* and a pressure roller 632*b*. The laminate fixing section 632 applies heating and pressurizing to the sheet and the laminate film F pinched in a nip portion formed by the heating roller 632*a* and the pressure roller 632*b*. Thus, the laminate fixing section 632 fixes the laminate film F to the sheet. That is, the heating roller 632*a* and the pressure roller 632*b* function as a conveyance roller pair according to the present invention that forms a nip portion of the lamination section 63.

The heating roller 632*a* has a halogen heater or the like built-in and heats the laminate film F and the sheet in an overlapped state. Thus, the laminate fixing section 223 fuses the adhesive layer of the laminate film F.

The pressure roller 632*b* is pressed against the heating roller 632*a* by being urged upward by an urging member (not illustrated) such as a spring. Thus, the pressure roller 632*b* forms a nip portion where the heating roller 632*a* and the pressure roller 632*b* are in surface contact with each other. The pressure roller 632*b* presses, against the sheet, the laminate film F whose adhesive layer has been melted by the heating roller 632*a*.

The heating roller 632*a* and the pressure roller 632*b* melt the adhesive layer of the laminate film F and cause the melted adhesive layer to adhere to the surface of the sheet, thereby performing heat pressure bonding.

Figure 3A:
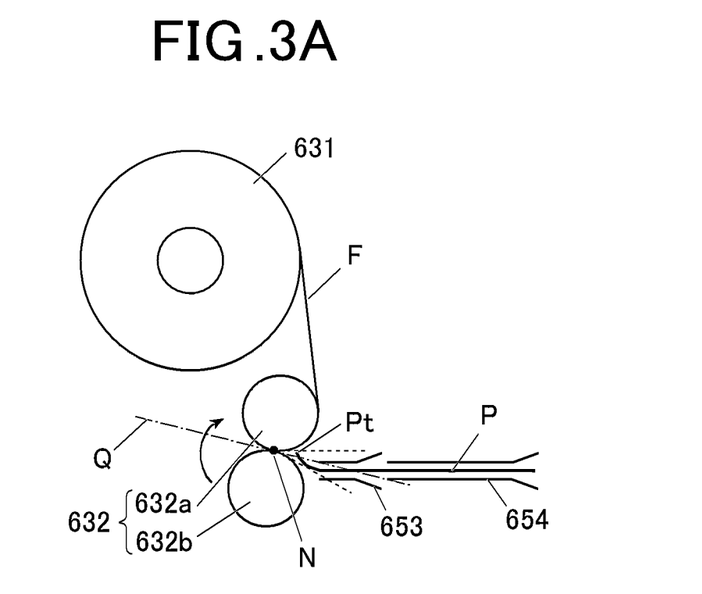
FIG. 3A and FIG. 3B are diagrams illustrating a state where a conveyance roller pair (nip portion) is moved in accordance with a curl.
Figure 3B:
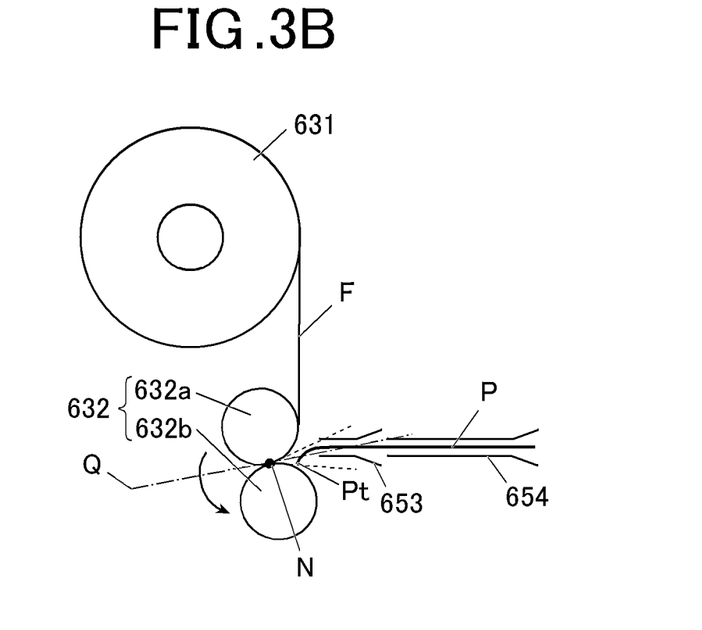

For example, in a case where a leading end of a sheet does not face the nip portion due to curling of the sheet, a jam may occur due to inability to form a nip in the nip portion. Therefore, in the present embodiment, as shown in FIG. 3A and FIG. 3B, the controller 21 of the image reading device 20 moves the conveyance roller pair for the purpose of displacing the direction of the nip portion in accordance with the curl. Specifically, the controller 21 moves the conveyance roller pair such that the relative position between a tangent line Q at the nip point N of the nip portion and the leading end Pt of the sheet P is displaced based on the curling amount and the curling direction judged by the second judgment section. The displacement of the relative positions of the tangent line Q at the nip point N of the nip portion and the leading end Pt of the sheet P means that the leading end Pt of the sheet P is within a predetermined distance from the tangent line Q. The predetermined distance is a distance by which the leading end Pt of the sheet P can be reliably introduced into the nip portion. The conveyance roller pair includes the heating roller 632*a* and the pressure roller 632*b*. Thus, the leading end Pt of the sheet P can be reliably introduced into the nip portion. Therefore, it becomes possible to appropriately nip the sheet P, and it is possible to reduce the occurrence of the jam. Note that the direction of the displacement may be the up/down direction or the rotating direction.

That is, the controller 21 moves the conveyance roller pair such that the relative position between the tangent line Q at the nip point N of the nip portion and the leading end Pt of the sheet P is displaced based on the curling amount and the curling direction judged by the second judgment section. That is, the controller 21 functions as a movement controller of the present invention.

Note that FIG. 3A is a diagram illustrating a case where the conveyance roller pair (nip portion) is moved in accordance with a curl in which the leading end Pt of the sheet P is curved upward (downward convex curl). FIG. 3B is a diagram in which a conveyance roller pair (nip portion) is moved in accordance with a curl in which a leading end Pt of the sheet P is curved downward (upward convex curl).

The cutting section 64 is provided on the downstream side of the lamination section 63 in a sheet conveyance path. The cutting section 64 cuts the laminate film F between the conveyed sheets.

The conveying section 65 includes a plurality of roller pairs and conveys, in the laminating device 60, a sheet conveyed from the image forming apparatus 10. In a case where the sheet is subjected to the laminating process, the conveying section 65 conveys the sheet through the first conveyance path 651 (see FIG. 1) in the order of the lamination section 63 and the cutting section 64. Thus, the conveying section 65 ejects the sheet subjected to the laminating process to the sheet ejection tray T3. When the sheet is not to be subjected to the laminating process, the conveying section 65 conveys the sheet through the second conveyance path 652 (refer to FIG. 1). The second conveyance path 652 is a path that does not pass through the lamination section 63 and the cutting section 64.

Figure 4A:
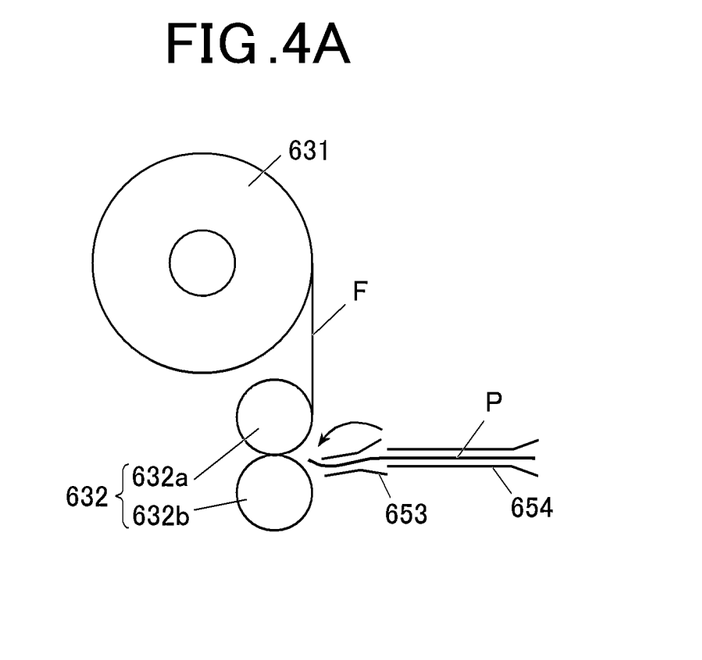
FIG. 4A and FIG. 4B are diagrams illustrating a state in which a movable guide is rotated in accordance with the curl.
Figure 4B:
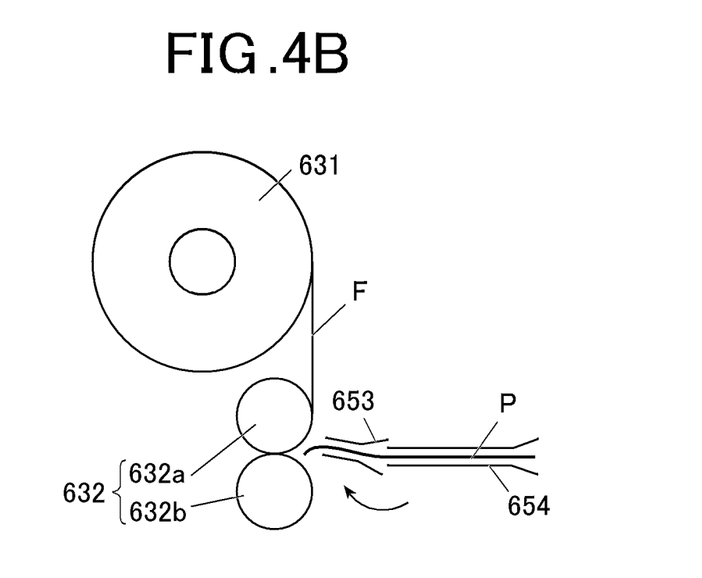

Furthermore, as illustrated in FIGS. 1, FIG. 4A, and FIG. 4B, a movable guide 653 is provided on the upstream side of the lamination section 63 in the first conveyance path 651. The movable guide 653 introduces the sheet into the nip portion of the lamination section 63. Furthermore, on the upstream side of the movable guide 653, a fixed guide 654 is provided which guides the sheet to the movable guide 653.

The movable guide 653 is fixed horizontally toward the nip portion of the lamination section 63 at a normal time (when the curl of the sheet is not detected) (see FIG. 1). The movable guide 653 is configured to be able to rotate up and down in accordance with the curl when the curl of the sheet is detected, (see FIGS. 4A and FIG. 4B). That is, the movable guide 653 is configured to be able to change an introduction angle at which the sheet is introduced into the nip portion. Note that FIG. 4A is a diagram in which the movable guide 653 is turned in accordance with the curl (downward convex curl) in which the leading end Pt of the sheet P is curved upward. FIG. 4B is a diagram in which the movable guide 653 is turned in accordance with the curl (upward convex curl) in which the leading end Pt of the sheet P is curved downward.

In the present embodiment, for the purpose of displacing the direction of the leading end of the sheet in accordance with the curl, the controller 21 of the image reading device 20 controls the introduction angle of the sheet to the nip portion of the movable guide 653. Specifically, the controller 21 controls the introduction angle of the sheet to the nip portion of the movable guide 653 based on the curling amount and the curling direction judged by the second judgment section. Thus, the leading end of the sheet can be directed to the nip portion. Therefore, it is possible to appropriately nip the sheet, and to reduce the occurrence of the jam.

That is, the controller 21 of the image reading device 20 controls the introduction angle of the sheet to the nip portion of the movable guide 653 based on the curling amount and the curling direction judged by the second judgment section. That is, the controller 21 functions as a guide controller of the present invention.

Next, the operation of the image processing system 1 according to the present embodiment is described with reference to the flowchart in FIG. 5. In the example illustrated in FIGS. 3A and 3B, a case will be described in which the controllers 11, 21, and 61 of the respective devices (the image forming apparatus 10, the image reading device 20, and the laminating device 60) constituting the image processing system 1 execute processing in cooperation with each other, but the present invention is not limited thereto. For example, any one of the controllers 11, 21, and 61 (or a controller (not shown)) provided separately from each device) may play a central role (role as a command tower) and may instruct the controller of each device to execute processing.

First, the controller 11 of the image forming apparatus 10 allows the image (image for printing) to be formed on the sheet based on the print data (step S101). The sheet on which an image is formed is conveyed to the image reading device 20.

Next, the controller 21 of the image reading device 20 causes the image reading section 22 to read the image surface of the sheet conveyed from the image forming apparatus 10 (step S102). The sheet conveyed from the image forming apparatus 10 is a sheet on which an image is formed in step S101.

Next, the controller 21 judges the curling amount and the curling direction of the sheet based on the read result (curling information) by the image reading section 22 in step S102 (step S103).

Next, the controller 21 judges the level of curl (e.g., 0 to 4) based on the curling amount of the sheet judged in step S103 (step S104).

In a case where the level is judged as level 0, the controller 21 directly proceeds to step S109. Level 0 is, for example, curling amount ≤1 mm.

On the other hand, upon judgment as level 1, the controller 21 determines to perform a curling correction process (step S105). Level 1 is, for example, 1 mm<curling amount ≤10 mm. The curling correction process is a process of correcting the curl of the sheet by the decurler 32. At this time, the controller 21 controls the curling correction force of the sheet by the decurler 32 on the basis of the curling amount and the curling direction of the sheet judged in step S103. Thereafter, the process proceeds to step S109.

If the controller 21 judges that the level is level 2, the controller 21 determines to perform the guide changing process and/or the nip portion displacing process in addition to the curling correction process (step S106). Level 2 is, for example, 10 mm<curling amount ≤15 mm. The guide changing process is a process of controlling an introduction angle of the sheet to the nip portion of the movable guide 653. The nip portion displacing process is processing for moving the conveyance roller pair (the heating roller 632a and the pressure roller 632b) so that a relative position between a tangent line at a nip point of the nip portion and a leading end of the sheet is displaced. Thereafter, the process proceeds to step S109.

If the controller 21 judges that the level is Level 3, the controller 21 executes processing for causing the purge sheet ejection section 53 to purge the sheet to the purge tray T2 (step S107). Level 3 is, for example, 15 mm<curling amount ≤20 mm. Thereafter, the process is terminated. That is, when the curling amount judged by the second judgment section exceeds the third threshold value, the controller 21 causes the purge sheet ejection section 53 to purge the sheet to the purge tray T2. Here, the third threshold is the curling amount to the extent that the curl of the sheet cannot be completely corrected even if the curling correction process, the guide changing process, and the nip portion displacing process are performed. The third threshold value is, for example, 15 mm.

Furthermore, in the case of level 4, the controller 21 executes processing for immediately stopping the system and stopping conveyance of the sheet (step S108). Level 4 is, for example, curling amount >20 mm. Thereafter, the process is terminated. That is, when the curling amount judged by the second judgment section exceeds the fourth threshold value, the controller 21 stops conveyance of the sheet. That is, the controller 21 functions as a conveyance controller of the present invention. Here, the fourth threshold value is a curling amount with which it is preferable to stop and inspect the system because there is a high risk of causing a jam during sheet conveyance due to the excessively strong curl. The fourth threshold is, for example, 20 mm. That is, the fourth threshold value is larger than the third threshold value.

In step S109, the controller 21 judges the misregistration of the image with respect to the reference position based on the read result (image position) by the image reading section 22. Specifically, first, the controller 21 calculates the misregistration amount based on the read result by the image reading section 22. Next, based on the calculated misregistration amount, the controller 21 judges whether the state is "correction is unnecessary", "correction is possible", and "correction is not possible".

In a case where the controller 21 judges that correction is unnecessary, the process directly proceeds to step S111. The correction being unnecessary is a case where the misregistration≤the first threshold value.

Further, in a case where it is judged that the misregistration is correctable, the controller 21 determines to perform processing of changing the position of the sheet in the width direction by the sheet position changing section 42 (step S110). The correction is possible in a case where the first threshold value<the misregistration≤the second threshold value. Thereafter, the process proceeds to step S111.

When judging that the misregistration is the uncorrectable state, the controller 21 performs a process of causing the purge sheet ejection section 53 to purge the sheet to the purge tray T2 (step S107). The correction is not possible when the misregistration>the second threshold value. Thereafter, the process is terminated.

In step S111, the controller 21 causes each of the apparatuses to perform each of the processes determined to be performed in steps S105, S106, and S110. More specifically, the controller 21 causes the apparatuses to perform each process while conveying the sheet in the order of the sheet correcting apparatus 30, the sheet position changing apparatus 40, the purge sheet ejection apparatus 50, and the laminating device 60. In a case where it is judged that the level of curl is 0 in step S104 and it is judged that correction is not necessary in step S109, there is no process decided to be performed. Accordingly, the controller 21 proceeds to the next step S112 without causing each apparatus to perform each process.

Next, the controller 61 of the laminating device 60 performs the lamination on the sheet conveyed from the purge sheet ejection apparatus 50 (step S112). When the controller 61 executes lamination, the sheet conveyed from the purge sheet ejection apparatus 50 is conveyed to the lamination section 63 via the first conveyance path 651. The sheet subjected to lamination is ejected to the sheet ejection tray T3.

As described above, the image processing system 1 according to the present embodiment includes the reading section (the image reading section 22) and the lamination section 63. The reading section reads the image surface of the flat cut sheet on which the image is formed. The lamination section 63 is disposed on the downstream side of the reading section in the conveyance direction of the flat cut sheet and laminates the image surface of the flat cut sheet.

Therefore, according to the image processing system 1 according to the present embodiment, the flat cut sheet can be inspected before the lamination processing is performed. Thus, it is possible to detect the curl of the flat cut sheet, the misregistration of the image, the image defect, and the like. Therefore, it is possible to achieve the improvement in the quality of printed matter and the suppression of waste of the expensive laminate film.

The image processing system 1 according to the present embodiment also includes the first judgment section (controller 21) that judges the misregistration of the image with respect to the reference position based on the read result by the reading section.

Therefore, it is possible to detect the misregistration of the image. Therefore, it is possible to achieve the improvement in the quality of the printed matter and the suppression of waste of the expensive laminate film.

Furthermore, according to the image processing system 1 of the present embodiment, the flat cut sheet position changing section (sheet position changing section 42) and the flat cut sheet position controller (controller 21) are provided. The flat cut sheet position changing section is arranged between the reading section and the lamination section 63 and can change the position of the flat cut sheet. The flat cut sheet position controller causes the flat cut sheet position changing section to change the position of the sheet in the direction orthogonal to the conveyance direction of the flat cut sheet when the misregistration judged by the first judgment section exceeds the first threshold value.

Therefore, in a case where an image is placed at an unintended position with respect to the film position, the position of the flat cut sheet can be changed. Thus, it is possible to change the position of the flat cut sheet to an intended position. Therefore, appropriate lamination can be performed.

The image processing system 1 according to the present embodiment also includes a purge sheet ejection section 53 and a purge controller (controller 21). The purge sheet ejection section 53 is arranged between the reading section and the lamination section 63 and purges the flat cut sheet to a purge storage section (purge tray T2). The purge controller controls the purging of the flat cut sheet by the purge sheet ejection section 53. The first judgment section further detects an image defect of the image formed on the flat cut sheet. When the misregistration judged by the first judgment section exceeds a second threshold value or when an image defect is detected by the first judgment section, the purge controller causes the purge sheet ejection section 53 to purge the flat cut sheet to the purge storage section.

Therefore, a sheet with a defective image to which dirt or the like adheres or a sheet on which an image is formed at an unintended position with respect to the position of the film can be purged before the lamination. Therefore, waste of the expensive laminate film can be suppressed.

According to the image processing system 1 of the present embodiment, the second judgment section (controller 21) that judges the curling amount and curling direction of the flat cut sheet based on the read result by the reading section is provided.

Therefore, it is possible to detect the curl of the flat cut sheet. Therefore, it is possible to achieve the improvement in the quality of the printed matter and the suppression of waste of the expensive laminate film.

In addition, according to the image processing system 1 of the present embodiment, the decurling section (decurler 32) and the correction controller (controller 21) are provided. The decurling section is arranged between the reading section and the lamination section 63 and corrects the curl of the flat cut sheet. The correction controller controls a curling correction force of the flat cut sheet by the decurling section based on the curling amount and the curling direction judged by the second judgment section.

Therefore, it is possible to automatically correct the curl of the flat cut sheet in real time before performing the lamination. This can suppress jamming, corner folding, and curling of the output product. Therefore, it is possible to achieve the improvement in the quality of the printed matter and the suppression of waste of the expensive laminate film.

Furthermore, according to the image processing system 1 of the present embodiment, the movable guide 653 and the guide controller (controller 21) are included. The movable guide 653 introduces the flat cut sheet into the nip portion of the lamination section 63. The guide controller controls the introduction angle of the flat cut sheet to the nip portion of the movable guide 653 based on the curling amount and the curling direction judged by the second judgment section.

Therefore, the direction of the leading end of the flat cut sheet can be changed in accordance with the curl. Accordingly, it is possible to nip the flat cut sheet in an ideal form. Accordingly, it is possible to reduce adhesion to the laminate film and jamming that occur when the flat cut sheet is curled, and the leading end thereof does not face the nip portion.

The image processing system 1 according to the present embodiment includes the conveyance roller pair (heating roller 632*a* and pressure roller 632*b*) and the movement controller (controller 21). The conveyance roller pair constitutes the nip portion of the lamination section 63. The movement controller moves the conveyance roller pair such that the relative position between the tangent line at the nip point of the nip portion and the leading end of the flat cut sheet is displaced based on the curling amount and the curling direction judged by the second judgment section.

Therefore, the direction of the nip portion can be changed in accordance with the curl. Accordingly, it is possible to nip the flat cut sheet in an ideal form. Accordingly, it is possible to reduce adhesion to the laminate film and jamming that occur when the flat cut sheet is curled, and the leading end thereof does not face the nip portion.

The image processing system 1 according to the present embodiment also includes the purge sheet ejection section 53 and the purge controller (controller 21). The purge sheet ejection section 53 is arranged between the reading section and the lamination section 63 and purges the flat cut sheet to the purge storage section (purge tray T2). The purge controller controls the purging of the flat cut sheet by the purge sheet ejection section 53. When the curling amount judged by the second judgment section exceeds the third threshold value, the purge controller causes the purge sheet ejection section 53 to purge the flat cut sheet to the purge storage section.

Accordingly, in a case where the curl cannot be corrected, the purge storage section can purge the flat cut sheet before the lamination. Therefore, waste of the expensive laminate film can be suppressed.

Moreover, the image processing system 1 of the present embodiment includes the conveyance controller (controller 21) that stops the conveyance of the flat cut sheet when the curling amount judged by the second judgment section exceeds the fourth threshold.

Therefore, in a case where the curl is too strong and there is a high risk of causing a jam during sheet conveyance and the curl cannot be dealt with as a system, conveyance of the flat cut sheet can be stopped. Therefore, waste of the expensive laminate film can be suppressed.

Although an embodiment of the present invention is described specifically above, the embodiments of the present invention are not limited to the above, and various modifications are possible without leaving the scope of the invention.

Figure 6:
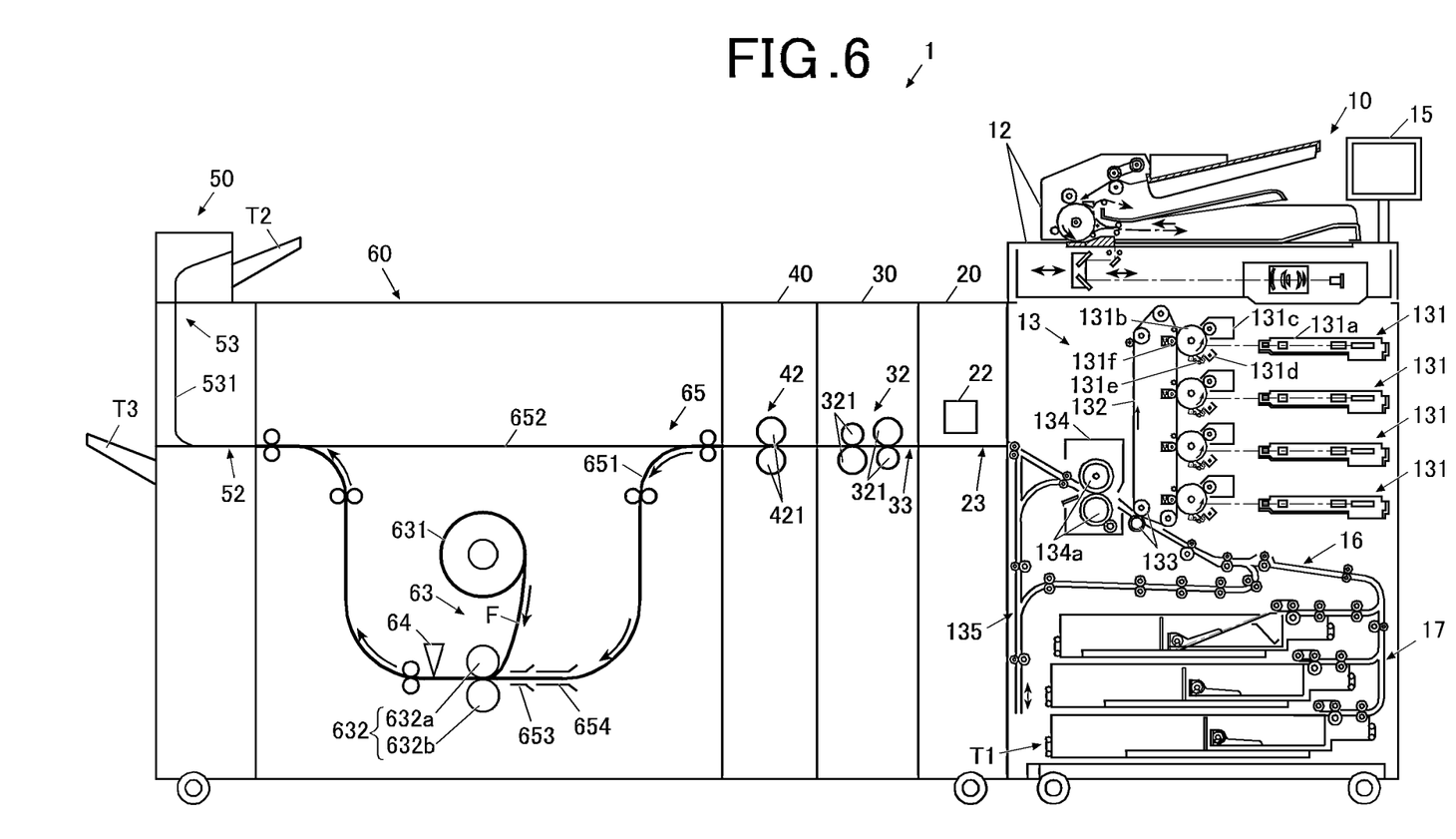
FIG. 6 is a diagram illustrating a schematic configuration of the image processing system according to a modification example.

Furthermore, although the above embodiment describes the example of the configuration in which the purge sheet ejection apparatus 50 is arranged on the upstream side in the conveyance direction with respect to the lamination section 63, there is no limitation thereto. For example, as illustrated in FIG. 6, the purge sheet ejection apparatus 50 may be disposed on the downstream side from the lamination section 63 in the conveyance direction. Also in this case, control similar to that in the configuration in which the purge sheet ejection apparatus 50 is arranged on the upstream side in the conveyance direction with respect to the lamination section 63 is performed. To be specific, when the misregistration judged by the first judgment section exceeds the second threshold value or when the image defect is detected by the first judgment section, the controller 21 of the image reading device 20 causes the purge sheet ejection section 53 to purge the sheet to the purge tray T2.

As described above, the purge sheet ejection section 53 is arranged on the downstream side in the conveyance direction with respect to the lamination section 63 and purges the flat cut sheet to the purge storage section (purge tray T2). As a result, the waste sheet can be purged even after lamination. Therefore, it is possible to prevent waste sheet from being mixed into the product.

Figure 5:
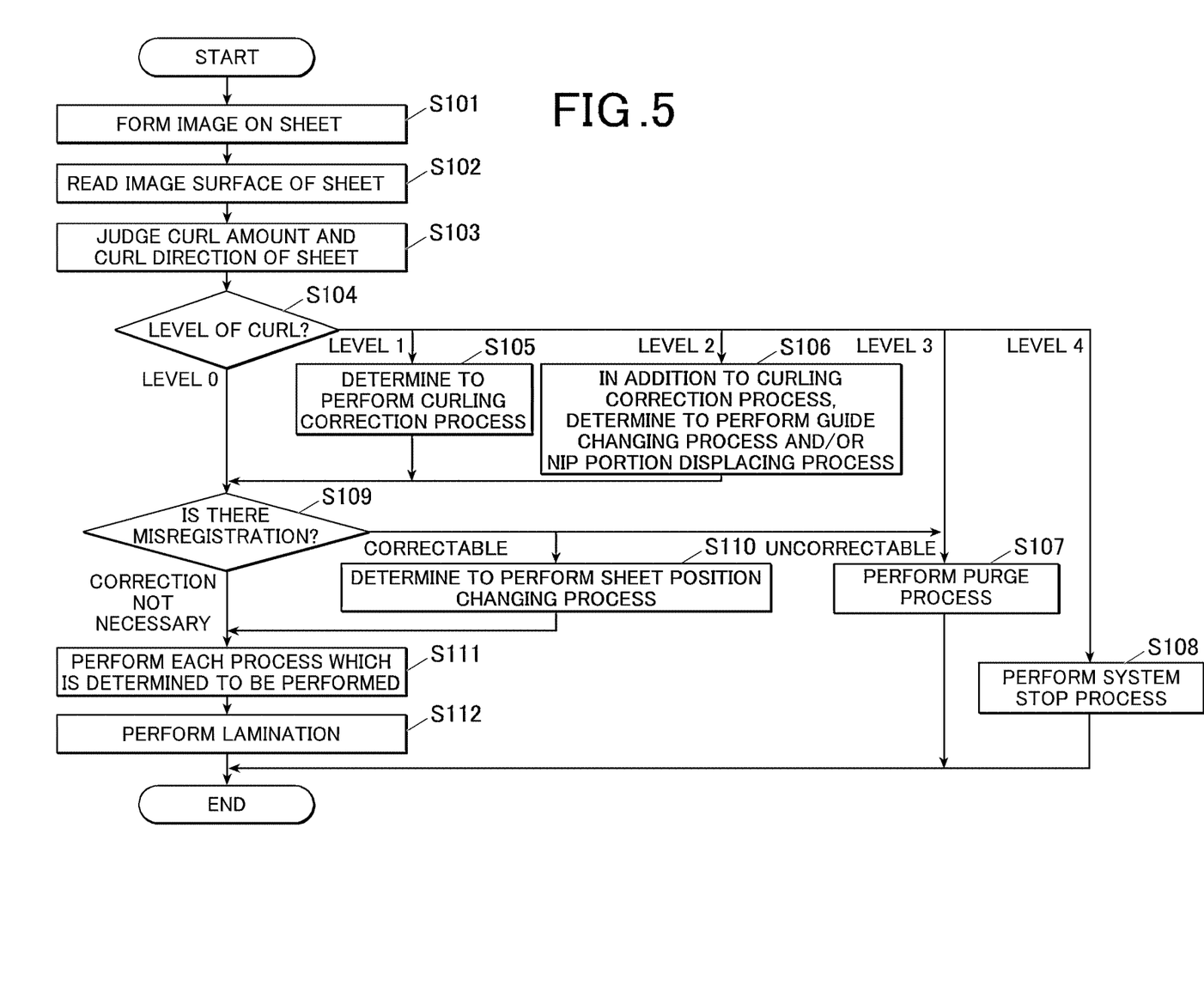
FIG. 5 is a flowchart illustrating an operation of the image processing system according to the present embodiment.

For example, in the embodiment described above, when it is judged that the level of the curl is level 3, a process of causing the purge sheet ejection section 53 to purge the sheet to the purge tray T2 is performed (see step S107 in FIG. 5). However, if an attempt is made to purge the sheet with the curl as it is, a conveyance failure (jam) may occur in the process.

In particular, when the purge processing is performed, in a case of the curl in the direction along the curve of the purge path 531, even if the purge of the sheet is performed with the curve as it is, the conveyance failure does not occur. The curl in the direction along the bent portion of the purge path 531 is the downward convex curl. The downward convex curl is the curl in which the leading end of the sheet is curved upward in a case where the purge path 531 is curved upward from the horizontal direction (refer to FIG. 1), for example. However, in the case of the curl in the direction opposite to the bending of the purge path 531, since the direction of the curl is not along the bending of the path, the conveyance failure is likely to occur. The curl in the direction opposite to the bending of the purge path 531 is an upward convex curl. The upward convex curl is the curl in which the leading end of the sheet is curved downward when the purge path 531 is curved upward from the horizontal direction (refer to FIG. 1), for example. Therefore, in the case of the curl in the direction opposite to the bending of the purge path 531, the curling correction process may be performed first, and then the purge process may be performed. Accordingly, the purge process can be performed more reliably without causing conveyance failure.

Furthermore, although the above embodiment illustrates and describes a configuration in which the sheet correcting apparatus 30, the sheet position changing apparatus 40, and the purge sheet ejection apparatus 50 are disposed in this order between the image forming apparatus 10 and the laminating device 60, there is no limitation thereto. That is, the sheet correcting apparatus 30, the sheet position changing apparatus 40, and the purge sheet ejection apparatus 50 may be arranged in random order. Provided that a preferable arrangement is one in which the sheet is passed through the sheet position changing apparatus 40 after correction of the curl by the sheet correcting apparatus 30. This is because it is possible to easily perform processing in the sheet position changing apparatus 40 and to suppress the occurrence of the jam in the sheet position changing apparatus 40.

Although the configuration including the image forming apparatus 10 (image forming section 13), the image reading device 20 (image reading section 22), and the laminating device 60 (lamination section 63) has been illustrated as the configuration of the image processing system of the present invention in the above embodiment, there is no limitation thereto. The configuration need only include at least the image reading device 20 (image reading section 22) and the laminating device 60 (lamination section 63). Therefore, the image forming apparatus 10 (image forming section 13) may be omitted.

In the above-described embodiment, the image processing system 1 in which the image reading device 20 comprising the image reading section 22 and the laminating device 60 comprising the lamination section 63 are separately configured has been exemplified, but the present invention is not limited thereto. For example, the image reading section 22 and the lamination section 63 may be configured as an integral apparatus (image processing apparatus). In addition, as long as the image reading section 22 is disposed on the upstream side of the lamination section 63 in the conveyance direction, the image reading section 22 may be configured to be incorporated in the laminating device 60. That is, the image reading device 20 may not be provided as a separate apparatus.

In addition, in the above-described embodiment, the configuration in which the controller 21 of the image reading device 20 functions as the correction controller, the flat cut sheet position controller, the purge controller, the movement controller, and the guide controller is exemplified, but the invention is not limited thereto. For example, instead of the controller 21, the plurality of functions may be assigned to a controller of another device, or a controller (not illustrated) provided separately from the devices. The controllers of the other apparatuses are the controller 11 of the image forming apparatus 10, the controller 61 of the laminating device 60, the controller 31 of the sheet correcting apparatus 30, the controller 41 of the sheet position changing apparatus 40, and the controller 51 of the purge sheet ejection apparatus 50. In addition, the plurality of functions may be distributed and assigned to the controllers 11, 21, 31, 41, 51, and 61 of the respective devices or controllers separately provided from the respective devices.

Furthermore, although an electrophotographic method image forming apparatus has been described as an example in the above embodiment, there is no limitation thereto. For example, the present invention can also be applied to an image forming apparatus of an inkjet type. An inkjet image forming apparatus, for example, jets an ink that is cured by a predetermined energy ray from a nozzle, and irradiates the jetted ink on the recording medium with the predetermined energy ray to cure the ink, thereby fixing the ink on the recording medium.

However, in a case where an electrophotographic method image forming apparatus is adopted, a curl occurs in the sheet due to heat applied to the sheet in the fixing section. Therefore, adopting the system configuration and the arrangement order of the present invention is greatly advantageous.

The detailed configuration and the detailed operation of the devices included in the image processing system can be suitably changed without leaving the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing system comprising:
   a reader that reads an image surface of a flat cut sheet on which an image is formed; and
   a laminator that is arranged on the downstream side of the reader in a conveyance direction of the flat cut sheet and laminates an image surface of the flat cut sheet.

2. The image processing system according to claim 1, further comprising a hardware processor configured to perform first judgment that judges a misregistration of the image with respect to a reference position based on a read result by the reader.

3. The image processing system according to claim 2, further comprising,
   a flat cut sheet position changer that is arranged between the reader and the laminator and which can change a position of the flat cut sheet,
   wherein the hardware processor performs flat cut sheet position controlling that controls the flat cut sheet position changer to change the position of the flat cut sheet in a direction orthogonal to the conveyance direction when the misregistration judged by the first judgment exceeds a first threshold value.

4. The image processing system according to claim 3, further comprising a purge sheet ejector which is arranged between the reader and the laminator and purges the flat cut sheet to a purge storage,
   wherein the hardware processor controls purging of the flat cut sheet by the purge sheet ejector,
   wherein the hardware processor further detects an image defect of the image formed on the flat cut sheet, and
   wherein the hardware processor controls the purge sheet ejector to purge the flat cut sheet to the purge storage when the misregistration judged by the first judgment exceeds a second threshold value or when the image defect is detected by the first judgment.

5. The image processing system according to claim 4, further comprising a hardware processor configured to perform second judgment that judges a curling amount and a curling direction of the flat cut sheet based on a read result by the reader.

6. The image processing system according to claim 5, further comprising a decurler that is disposed between the reader and the laminator and that corrects a curl of the flat cut sheet.

7. The image processing system according to claim 6, wherein the hardware processor controls a curling correction force for the flat cut sheet by the decurler, based on the curling amount and the curling direction judged by the second judgment.

8. The image processing system according to claim 5, further comprising a movable guide that introduces the flat cut sheet into a nip portion of the laminator,
   wherein the hardware processor controls an introduction angle for the flat cut sheet into the nip portion of the movable guide, based on the curling amount and the curling direction judged by the second judgment.

9. The image processing system according to claim 5, further comprising a conveyance roller pair constituting a nip portion of the laminator,
- wherein the hardware processor is configured to move the conveyance roller pair so that a relative position between a tangent line at a nip point of the nip portion and a leading end of the flat cut sheet is displaced, based on the curling amount and the curling direction judged by the second judgment.

10. The image processing system according to claim 5, further comprising a purge sheet ejector which is arranged between the reader and the laminator and purges the flat cut sheet to a purge storage,
- wherein the hardware processor controls purging of the flat cut sheet by the purge sheet ejector, and
- wherein the hardware processor controls the purge sheet ejector to purge the flat cut sheet to the purge storage when the curling amount judged by the second judgment exceeds a third threshold value.

11. The image processing system according to claim 10, wherein the hardware processor is configured to stop conveyance of the flat cut sheet when the curling amount judged by the second judgment exceeds a fourth threshold value.

12. The image processing system according to claim 2, further comprising a purge sheet ejector which is arranged on the downstream side in the conveyance direction with respect to the laminator and purges the flat cut sheet to a purge storage,
- wherein the hardware processor controls purging of the flat cut sheet by the purge sheet ejector,
- wherein the hardware processor further detects an image defect of the image formed on the flat cut sheet, and
- wherein the hardware processor controls the purge sheet ejector to purge the flat cut sheet to the purge storage when the misregistration judged by the first judgment exceeds a second threshold value or when the image defect is detected by the first judgment.

13. The image processing system according to claim 1, further comprising an image former that is disposed on an upstream side of the reader in the conveyance direction and forms an image on the flat cut sheet,
- wherein the reader reads the flat cut sheet on which the image is formed by the image former.

* * * * *